3,709,984
PHOTOREACTIVE TITANIUM DIOXIDE MATERIAL

Horace F. Dantro, Toms River, N.J., assignor to NL Industries, Inc., New York, N.Y.
No Drawing. Continuation-in-part of abandoned application Ser. No. 559,403, June 22, 1966. This application June 26, 1967, Ser. No. 648,955
Int. Cl. C01g 23/04
U.S. Cl. 423—610                    1 Claim

ABSTRACT OF THE DISCLOSURE

This invention relates in general to the preparation of titanium dioxide material which possesses photosensitive properties. More specifically it relates to a particular type of photosensitive titanium dioxide material which possesses sufficient photoreactive properties to be commercially useful in systems designed to respond to exposure to light i.e., photographic emulsions, copy paper and the like.

CROSS REFERENCE TO RELATED APPLICATION

This application is a continuation-in-part of my application Ser. No. 559,403 filed June 22, 1966, now abandoned.

BACKGROUND OF THE INVENTION

Many types of photosensitive materials are used in systems of this type. Among them are carbon black and zinc oxide. Carbon black although possessing excellent conductive properties has little or none of the photoreactive properties necessary for use in copy paper systems while zinc oxide although used with limited success has low opacity in copy papers.

Since titanium dioxide possesses a higher degree of opacity than zinc oxide, it would be desirable to produce a titanium dioxide material which would possess both a high degree of photoreactivity in photosensitive systems and in particular copy paper systems, and at the same time possess a high degree of opacity.

SUMMARY OF THE INVENTION

The photoreactive titanium dioxide material of the instant invention has the crystal structure of anatase and comprises finely divided particles having an average individual particle size of about 250 A. to 1500 A., a spectral characteristic of at least +4; a sulfur content calculated as percent S on a $TiO_2$ basis which falls within the range of from 0.03% to 0.4%; possesses a surface area from 10 to 55 sq. meters per grams; and a photoreactivity, measured by the mandelic acid test, as a change in reflectance of at least 5 units in 10 minutes when exposed to ultraviolet radiation.

This type of titanium dioxide is prepared by the process of the instant invention which comprises: forming a titanium hydrate, filtering, bleaching and washing said hydrate to remove the soluble salts, said bleached hydrate being substantially iron free; treating said bleached hydrate, if desired, with a phosphate compound calculated as $P_2O_5$ on a $TiO_2$ weight basis in amount up to 0.3% and if desired with a potassium salt up to 0.3% calculated as $K_2O$ on a $TiO_2$ weight basis; and calcining said hydrate at a temperature from 725° C. to 825° C. to reduce the sulfur content, calculated as S on a $TiO_2$ basis to fall within the range of from 0.03% to no more than 0.4% and to produce a soft calcined product; and then milling said calcined product to produce a finally divided titanium dioxide material having an average individual particle size from about 250 A. to 1500 A. The average particle was determined by photomicrograph examination.

DESCRIPTION OF THE PREFERRED EMBODIMENT

Although this process recited above appears at first glance to be similar to known processes for producing $TiO_2$ of pigmentary grade, it should be noted that the instant process is carried out in an unusual manner such that the product is not comparable to a commercial grade of $TiO_2$ pigment.

One great difference is the fact that the titanium hydrate is calcined directly without adding any treating agents, or at most, only small amounts of the salts normally used in producing pigmentary $TiO_2$ i.e., either or both of a phosphate salt and a potassium salt. Moreover, the titanium hydrate is calcined at relatively low temperatures of from 725° C. to 825° C. until the calcined anatase titanium dioxide contains from 0.03% to no more than 0.4% sulfur calculated as S on a $TiO_2$ basis. This particular type of calcination produces a soft calcine. Such a calcined material would be definitely undercalcined according to any of the prior art processes for producing titanium dioxide pigment, and as a consequence as compared to commercial grades of $TiO_2$ pigment has inferior pigment properties, such as tinting strength, hiding power, oil absorption, chalk resistance, etc. when used in paint systems.

In addition to undercalcining the titanium dioxide hydrate to produce a soft calcine, this soft calcine is then subjected to a milling operation to form a finely divided material. The spectral characteristic of this milled material has been found to be at least +4, as determined by the test described below, and is far in excess of that of a commercial grade of $TiO_2$ pigment, the spectral characteristic of which is normally within the range of +2 to 0.

Test for spectral characteristic of $TiO_2$

The titanium dioxide was mixed with a soya alkyd vehicle containing carbon black and the mixture was formed into a paste. The amounts of the $TiO_2$ and carbon black present in the paste were 3.3 to 0.1 grams respectively. The paste was then spread onto a lacquered sheet and the wet film was immediately tested in a Colormaster Colorimeter. The spectral characteristic of the $TiO_2$ was measured by substracting the red from the blue reflectance values and comparing this result with the spectral characteristic of a $TiO_2$ standard previously determined.

Such a milled, undercalcined material as that produced according to the method of this invention is of little or no use as a commercial grade of pigment in paint systems but has been found however to have a high photoreactivity and hence is especially well suited for use in photosensitive systems of the copy paper type.

Before further describing the instant invention, it is desirable to define what is meant by "photoreactivity." A photoreactive material is one which will react with a light sensitive system and in particular a copy paper system to form an image when exposed to ultraviolet illumination.

Although most commercial grades of titanium dioxide pigment possess a slight amount of photoreactivity, the amount is insufficient to be useful in copy paper systems. However the particular titanium dioxide material produced by the instant invention is of non-pigmentary grade, and is specifically designed to have a high degree of photoreactivity and opacity in paper systems and hence is especially useful in the copy paper industry.

In the instant invention the titanium dioxide materials obtained were tested for photoreactivity and found to meet certain standards which have been selected as being commercially useful.

These tests and their standards are described as follows:

Mandelic acid test for photoreactivity of titanium dioxide materials 10 g. titanium dioxide are mixed with a sufficient amount of aqueous 0.5 M mandelic acid solution to form a soft paste. The paste is placed upon a microscope slide glass plate (5 in. x 5 in. x 1 mm.), covered with a thick glass plate (5 in. x 5 in. double strength window glass), and pressed to distribute the paste over an area about 3 inches in diameter, microscope slides (1 in. x 3 in. x 1 mm.) are used between the plates as spacers. The edges of the plates are bound together with 1 inch tape to prevent evaporation. The initial reflectance of the paste through the microscope slide glass plate is measured by means of a Colormaster differential colorimeter with the green filter. The plates are placed on a rotating turntable, microscope slide glass plate uppermost, underneath three sunlamps (275 watts) arranged in an equilateral triangle 13 inches from center to center and approximately 13 inches above the turntable. Before each run the ultraviolet intensity of each lamp is measured and weak lamps are replaced. Reflectance measurements are made at suitable intervals and the change in percent reflectance with time is determined. This figure is a measure of the photoreactivity of the titanium dioxide material. A change in reflectance of at least 5 units in 10 minutes is required as the minimum acceptable for commercial applications.

A more detailed description of the instant invention is presented in the following examples:

EXAMPLE 1

A titanium hydrate was prepared by adding a titanium sulfate-ferrous sulfate solution to hot water and boiling the mixture. The titanium sulfate solution used had the following analysis:

| | | |
|---|---|---|
| $TiO_2$ | g.p.l. | 250 |
| $H_2SO_4$ | g.p.l. | 500 |
| $FeSO_4$ | g.p.l. | 169 |
| $H_2SO_4/TiO_2$ | | 2.0 |
| Spec. gravity at 60° C. | | 1.675 |

3000 ml. of this titanium solution heated to 96° C. were added to 750 ml. water heated to 96° C. within a period of 16 minutes. The entire mixture was heated to boiling and boiled for 3 hours to complete the hydrolysis. 790 ml. of hot water were added to the mixture to cut the concentration to 165 g.p.l. $TiO_2$.

The hydrate was filtered, washed free from soluble salts, bleached with 10% $H_2SO_4$ and 0.1% aluminum metal for 1 hour at 80° C. at 20% solids, then filtered and washed with water until iron free. The washed cake was then treated with 0.1% phosphoric acid and 0.22% potassium hydroxide, calculated as $P_2O_5$ and $K_2O$ respectively on a $TiO_2$ weight basis, and the treated titanium hydrate was calcined at 780° C. for 1½ hours to produce a soft calcined $TiO_2$ material. The soft calcined material was then subjected to steam milling at 5 to 1 steam to pigment ratio. After milling the calcined $TiO_2$ material had the following properties:

(1) An average particle size of 1000 A.
(2) A sulfur content of 0.09% calculated as S on a $TiO_2$ weight basis
(3) A spectral characteristic of +4.4
(4) A surface area of 14 square meters per gram
(5) Its photoreactivity as measured in a 0.5 M mandelic acid solution as the loss in reflectance was 12.3 in 10 minutes when exposed to ultraviolet radiation

EXAMPLE 2

Another example of $TiO_2$ material was produced using substantially the procedure described in Example 1 except that the bleached hydrate was treated with 0.1% phosphoric acid and 0.1% potassium hydroxide calculated as $P_2O_5$ and $K_2O$ on a $TiO_2$ weight basis. The hydrate was calcined at 800° C. for 1 hour and milled in the same manner as that described in Example 1.

The $TiO_2$ material had the following properties:

(1) An average particle size of 600 A.
(2) A spectral characteristic of +6.6
(3) A sulfur content of 0.1% calculated as S
(4) A surface area of 29.1 sq. meters per gram
(5) Its photoreactivity as measured in a 0.5 M mandelic acid solution as the loss in reflectance was 20.4 in 10 minutes when exposed to ultraviolet radiation

EXAMPLES 3–5

In these examples the same procedure was again used except that no treatments were added to the hydrates before calcination in Examples 4 and 5. The temperatures of calcination were 750° C., 770° C. and 820° C. respectively.

The results along with those of Examples 1 and 2 are recorded in the table below.

In order to compare the products of the instant invention with a commercial grade of $TiO_2$ pigment the following control pigment was prepared:

A titanium hydrate similar to that used in the preceding examples was treated with 0.25% phosphoric acid and 0.39% potassium hydroxide calculated as $P_2O_5$ and $K_2O$ respectively on a $TiO_2$ basis. The treated hydrate was then calcined at 985° C. for two hours in the manner normally used to prepare commercial grades of $TiO_2$ pigment. The calcined $TiO_2$ was then milled.

The results are recorded in the following table:

Thus as compared to a commercial grade of $TiO_2$ pigment, or known grades of ZnO pigment, the $TiO_2$ material of this invention will be seen to have highly superior photoreactivities as well as good opacity and hence are ideally suited for use in photoreactive systems of the copy paper type.

TABLE

| | Example number | | | | | Control |
|---|---|---|---|---|---|---|
| | 1 | 2 | 3 | 4 | 5 | |
| precalcination treatment: | | | | | | |
| Percent $K_2O$ | 0.22 | 0.1 | 0.22 | | | 0.39 |
| Percent $P_2O_5$ | 0.1 | 0.1 | 0.1 | | | 0.25 |
| Calcination temp., °C | 780 | 800 | 750 | 770 | 820 | 985 |
| Time (hrs.) | 1.5 | 1.0 | 1.5 | 2.0 | 1.5 | 2.0 |
| Calcined pigment: | | | | | | |
| Percent S | 0.09 | 0.10 | 0.26 | 0.14 | 0.035 | 0.006 |
| Spec. char. | +4.4 | +6.6 | +4.5 | +5.9 | +4.0 | +2.2 |
| Avg. particle size, anstroms | 1,000 | 600 | 400 | 600 | 700 | 2,200 |
| Surface area, sq. m./g | 14 | 29 | 47 | 31 | 21 | 11.5 |
| Photoreactivity, loss in reflect. in 10 min | −12.3 | −20.4 | −27.7 | −20.1 | −20.1 | −3.0 |

From the above description and by the examples presented, a new and novel type of photoreactive titanium dioxide material has been produced. The material is finely divided and has a small average particle size. It has a high spectral characteristic and a high surface area. The instant material also possesses the necessary photoreactivity to be useful in the copy paper industry.

While this invention has been described and illustrated by the examples shown, it is not intended to be strictly limited thereto, and other variations and modifications may be employed within the scope of the following claim.

I claim:
1. A photoreactive titanium dioxide material having the crystal structure of anatase and comprising finely divided titanium dioxide particles having an average individual particle size of about 250 A. to 1500 A., a spectral characteristic of at least +4, a sulfur content falling within the range of 0.03% to 0.4% calculated as S on a $TiO_2$ basis and a surface area from 10 to 55 square meters per gram, and having a loss in reflectance of at least 5 units in 10 minutes as measured by the mandelic acid test.

References Cited

UNITED STATES PATENTS

| 2,817,595 | 12/1957 | Kalinowski | 106—300 |
| 3,380,823 | 4/1968 | Gold | 96—88 |

FOREIGN PATENTS

| 625,376 | 8/1961 | Canada | 23—202 |

OTHER REFERENCES

McTaggart, F. K., Bear, J., J. Appl. Chem., Dec. 5, 1955, pp. 643–653, Phototropic Effects in Oxides. I. Titanium Dioxide.

J. TRAVIS BROWN, Primary Examiner

J. L. GOODROW, Assistant Examiner

U.S. Cl. X.R.

96—88